United States Patent
Stratemeier et al.

(10) Patent No.: US 10,543,937 B2
(45) Date of Patent: Jan. 28, 2020

(54) STATIONKEEPING TECHNIQUES FOR SPACECRAFT IN INCLINED GEOSYNCHRONOUS ORBIT

(71) Applicant: Space Systems/Loral, LLC, Palo Alto, CA (US)

(72) Inventors: Darren R. Stratemeier, Mountain View, CA (US); Andrew E. Turner, Mountain View, CA (US); Robert S. Day, Jr., Torrance, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 400 days.

(21) Appl. No.: 15/441,037

(22) Filed: Feb. 23, 2017

(65) Prior Publication Data

US 2017/0247124 A1 Aug. 31, 2017

Related U.S. Application Data

(60) Provisional application No. 62/300,667, filed on Feb. 26, 2016, provisional application No. 62/300,682, (Continued)

(51) Int. Cl.
*B64G 1/10* (2006.01)
*B64G 1/24* (2006.01)
(Continued)

(52) U.S. Cl.
CPC ............ *B64G 1/242* (2013.01); *B64G 1/007* (2013.01); *B64G 1/1007* (2013.01);
(Continued)

(58) Field of Classification Search
CPC .................................................. B64G 1/242
See application file for complete search history.

(56) References Cited

U.S. PATENT DOCUMENTS 3,836,969 A 9/1974 Bond et al.
3,995,801 A 12/1976 Bond
(Continued)

FOREIGN PATENT DOCUMENTS

DE 22 52 370 A1 5/1973
EP 0 575 678 A1 9/1992
(Continued)

OTHER PUBLICATIONS

Shan, J. et al., "Optimization of Injection Parameters for Slightly Inclined Geosynchronous Orbits"; 54th AIAA Aerospace Sciences Meeting, AIAA SciTech, (AIAA 2016-0217).
(Continued)

*Primary Examiner* — Richard G Davis
(74) *Attorney, Agent, or Firm* — Weaver Austin Villeneuve & Sampson LLP

(57) ABSTRACT

A constellation of Earth-orbiting spacecraft, the constellation having an orbital maneuver lifetime life (OML), includes a first spacecraft disposed in a first orbit and a second spacecraft disposed in a second orbit, each of orbit being substantially circular with a radius of approximately 42,164 km and having a respective inclination with respect to the equator specified within a range of 10° to 20°. The first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation Δ-RAAN1. A first stationkeeping delta-V (ΔV1) applied over the OML to the first spacecraft, in combination with a second delta-V (ΔV2) applied over the OML to the second spacecraft, maintains the Δ-RAAN1 approximately constant and an actual inclination within specification, and ΔV1 approximately equals ΔV2.

20 Claims, 6 Drawing Sheets

Related U.S. Application Data filed on Feb. 26, 2016, provisional application No. 62/300,685, filed on Feb. 26, 2016.

(51) Int. Cl.
*B64G 1/00* (2006.01)
*B64G 1/40* (2006.01)

(52) U.S. Cl.
CPC ............ *B64G 1/1085* (2013.01); *B64G 1/40* (2013.01); *B64G 1/405* (2013.01)

(56) References Cited

U.S. PATENT DOCUMENTS

| | | | |
|---|---|---|---|
| 4,502,051 | A | 2/1985 | Dondl |
| 4,809,935 | A | 3/1989 | Draim |
| 5,120,007 | A | 6/1992 | Pocha et al. |
| 5,619,211 | A | 4/1997 | Horkin et al. |
| 5,813,634 | A | 9/1998 | Pizzicaroli et al. |
| 6,305,646 | B1 | 10/2001 | McAllister et al. |
| 6,389,336 | B2 | 5/2002 | Cellier |
| 7,255,308 | B1 | 8/2007 | Murphy |
| 7,720,604 | B1* | 5/2010 | Cichan ............... B64G 1/244 701/531 |
| 8,016,240 | B2 | 9/2011 | Caplin et al. |
| 10,329,034 | B2 | 6/2019 | Stratemeier et al. |
| 2001/0041950 | A1 | 11/2001 | Cellier |
| 2004/0056146 | A1 | 3/2004 | Goodzeit et al. |
| 2006/0240767 | A1 | 10/2006 | Jacomb-Hood et al. |
| 2008/0027595 | A1* | 1/2008 | Fowler ............... B64G 1/1085 701/13 |
| 2008/0307466 | A1 | 12/2008 | Wang |
| 2013/0002484 | A1 | 1/2013 | Katz |
| 2014/0017992 | A1 | 1/2014 | Bigras et al. |
| 2014/0339368 | A1 | 11/2014 | Majer |
| 2015/0158602 | A1 | 6/2015 | Marshack et al. |
| 2015/0158603 | A1 | 6/2015 | Marshack et al. |
| 2015/0197350 | A1 | 7/2015 | Ho |
| 2015/0268349 | A1 | 9/2015 | Veysoglu et al. |

FOREIGN PATENT DOCUMENTS

| | | |
|---|---|---|
| EP | 0 836 290 A2 | 4/1998 |
| GB | 2 288 038 A | 10/1995 |
| WO | WO 2008/013592 A2 | 1/2008 |
| WO | WO 2009/013404 A2 | 1/2009 |

OTHER PUBLICATIONS

Jiancheng, L., "Separation of Geostationary Satellites With Eccentricity and Inclination Vector," 2009 International Conference on Measuring Technology and Mechatronics Automation, IEEE, 2009, 855-858.
International Search Report and Written Opinion dated Jun. 22, 2017 issued in PCT/US2017/019437.
International Search Report and Written Opinion dated Jun. 21, 2017 issued in PCT/US2017/019515.
International Search Report and Written Opinion dated Jun. 7, 2017 issued in PCT/US2017/019475.
Kechichian J A: "Orbit Plane Control Strategies for Inclined Geosynchronous Satellite Constellation", Journal of Spacecraft and Rockets, American Institute of Aeronautics and Astronautics,Reaston,VA, US, val. 35, No. 1, Jan. 1, 1998 (Jan. 1, 1998 ), pp. 46-54, XP000741314, ISSN: 0022-4650.
International Preliminary Report on Patentability dated Sep. 7, 2018 issued in PCT/US2017/019515.
International Preliminary Report on Patentability dated Sep. 7, 2018 issued in PCT/US2017/019437.
U.S. Notice of Allowance dated Feb. 15, 2019 issued in U.S. Appl. No. 15/441,040.

\* cited by examiner

Right Ascension of the Ascending Node, ("RAAN" or "Ω") Ranges from 0° TO 360°, Measured Eastward around the Plane of the Equator

STATIONKEEPING TECHNIQUES FOR SPACECRAFT IN INCLINED GEOSYNCHRONOUS ORBIT

CROSS-REFERENCE TO RELATED APPLICATIONS

This disclosure claims priority to U.S. Provisional Patent Application No. 62/300,667, filed Feb. 26, 2016, entitled "CONSTELLATION OF TWO SPACECRAFT IN INCLINED GEOSYNCHRONOUS ORBIT," to U.S. Provisional Patent Application No. 62/300,682, filed Feb. 26, 2016, entitled "STATIONKEEPING TECHNIQUES FOR SPACECRAFT IN INCLINED GEOSYNCHRONOUS ORBIT," and to U.S. Provisional Patent Application No. 62/300,685, filed Feb. 26, 2016, entitled "EFFICIENT ORBITAL STORAGE AND DEPLOYMENT FOR SPACECRAFT IN INCLINED GEOSYNCHRONOUS ORBIT" each assigned to the assignee hereof, the disclosures of which are hereby incorporated by reference in their entirety into this Patent Application for all purposes.

TECHNICAL FIELD

This invention relates generally to communications satellites, and more particularly to improved techniques for stationkeeping of spacecraft disposed in moderately inclined geosynchronous orbits.

BACKGROUND

The assignee of the present invention manufactures and deploys spacecraft for, inter alia, communications, broadcast services and/or imaging services. Many satellite services are provided from spacecraft in geosynchronous equatorial orbit (GEO), a circular, equatorial orbit having a radius of 42,164 kilometers and an orbital period of one sidereal day of (23 hr 56 min. 4 seconds, the period of rotation of Earth in inertial space). A satellite in GEO appears stationary to a ground station on the earth and can provide coverage to a significant portion of the globe at latitudes (the "GEO coverage latitudes") between about 70° N and 70° S. Because longitudes ("slots") at which spacecraft may be stationed in GEO (i.e., available locations on the GEO "arc") are limited, it is desirable to find techniques for providing a service coverage region size similar to existing geostationary spacecraft by disposing spacecraft in moderately inclined, circular, geosynchronous orbits (i.e., an orbit having a radius of 42,164 kilometers and an inclination to the equator within the range of about 10° to about 20°).

The present applicant has developed improved techniques for deploying and operating a constellation of spacecraft arranged in moderately inclined orbits. For example, in a related patent application, filed concurrently herewith and entitled "Inclined Geosynchronous Orbit Spacecraft Constellations", attorney docket number LORLP287, owned by the assignee of the present application, techniques are described for providing uninterrupted coverage to a substantial portion of GEO coverage latitudes from a moderately inclined geosynchronous orbit using a constellation consisting of as few as two spacecraft has been described. As a further example, in a related patent application, filed concurrently herewith and entitled "Orbital Storage and Deployment for Spacecraft in Inclined Geosynchronous Constellations", attorney docket number LORLP298, owned by the assignee of the present application, techniques are described for providing spare on-orbit spacecraft capable of replacing any spacecraft in the constellation when called up. The disclosures of the above mentioned patent applications are hereby incorporated in their entirety into the present application for all purposes.

SUMMARY

The presently disclosed techniques relate to improved techniques for stationkeeping of spacecraft disposed in moderately inclined geosynchronous orbits.

According to some implementations a constellation of Earth-orbiting spacecraft, having an orbital maneuver lifetime life (OML), includes two or more spacecraft, including a first spacecraft disposed in a first orbit and a second spacecraft disposed in a second orbit. Each of the first orbit and the second orbit is substantially circular with a radius of approximately 42,164 km. The first orbit has a first specified inclination with respect to the equator and the second orbit has a second specified inclination with respect to the equator, the first specified inclination and the second specified inclination each being within a range of 10° to 20°. The first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation Δ-RAAN1. A first stationkeeping delta-V (ΔV1) applied over the OML to the first spacecraft, in combination with a second delta-V (ΔV2) applied over the OML to the second spacecraft, is sufficient to maintain the Δ-RAAN1 approximately constant and an actual inclination of the first orbit and the second orbit within an acceptable variance from the respective first specified inclination and second specified inclination and ΔV1 approximately equals ΔV2.

In some examples, the Δ-RAAN1 may be approximately 90°.

In some examples, the two or more spacecraft may include a third spacecraft disposed in a third orbit. The third orbit may have, at BOL, a third RAAN (BOL-RAAN3) the BOL-RAAN1 and the BOL-RAAN3 being separated by a second angular separation Δ-RAAN2. ΔV1, in combination with a third delta-V (ΔV3) applied over the OML to the third spacecraft, may be sufficient to maintain the Δ-RAAN2 approximately constant and an actual inclination of each respective orbit within the acceptable variance from the specified inclination. In some examples, the Δ-RAAN1 is approximately equal to the Δ-RAAN2.

In some examples, the ΔV1 and the ΔV2 may be sufficient only to maintain the Δ-RAAN and the specified inclination approximately constant. In some examples, ΔV1/OML may correspond to less than 45 meters per second per year.

In some examples the first specified inclination may approximately equal the second specified inclination.

In some examples, the BOL-RAAN1 and the BOL-RAAN2 may be determined by executing, on a processor, at least two cycles of an optimization loop, the optimization loop including: (i) a first calculation, for a current set of beginning of life (BOL) orbit parameters and a current set of end of life (EOL) orbit parameters, a first stationkeeping delta-V requirement for the first spacecraft and a second stationkeeping delta-V requirement for the second spacecraft, sufficient to maintain the Δ-RAAN1 and the specified inclination approximately constant; (ii) a second calculation of a difference between the first stationkeeping delta-V requirement and the second stationkeeping delta-V requirement; and (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii).

According to some implementations a method includes selecting, for a constellation of Earth-orbiting spacecraft, a current set of beginning of life (BOL) orbit parameters and a current set of end of life (EOL) orbit parameters, the constellation including a first spacecraft disposed in a first orbit and a second spacecraft disposed in a second orbit, each of the first orbit and the second orbit being substantially circular with a radius of approximately 42,164 km, the first orbit being disposed in a first orbital plane and the second orbit being disposed in a second orbital plane, each of the first orbital plane and the second orbital plane having a specified inclination with respect to the equator within a range of 10° to 20°, the current set of BOL orbit parameters including, for the first orbital plane, a first BOL right ascension of ascending node (BOL-RAAN1) and, for the second orbital plane, a second BOL RAAN (BOL-RAAN2), the BOL-RAAN1 and the BOL-RAAN2 being separated by a BOL angular separation, BOL Δ-RAAN, the current set of EOL orbit parameters including, for the first orbit, a first EOL right ascension of ascending node (EOL-RAAN1) and, for the second orbit, a second EOL RAAN (EOL-RAAN2), the EOL-RAAN1 and the EOL-RAAN2 being separated by an EOL angular separation EOL Δ-RAAN that is approximately equal to BOL Δ-RAAN. The method further includes optimizing a constellation stationkeeping strategy, by executing, on a processor, at least two cycles of an optimization loop, the optimization loop comprising: (i) a first calculation, for the current set of beginning of life (BOL) orbit parameters and the current set of end of life (EOL) orbit parameters, a first stationkeeping delta-V requirement for the first spacecraft and a second stationkeeping delta-V requirement for the second spacecraft, sufficient to maintain the Δ-RAAN and the specified inclination approximately constant; (ii) a second calculation of a difference between the first stationkeeping delta-V requirement and the second stationkeeping delta-V requirement; and (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii).

In some examples, the first stationkeeping delta-V requirement and the second stationkeeping delta-V requirement may be sufficient only to maintain the Δ-RAAN and the specified inclination approximately constant.

In some examples, the specified value may be less than 5 meters per second.

According to some implementations, a method includes executing a stationkeeping strategy for a constellation of Earth-orbiting spacecraft, the constellation having an orbital maneuver lifetime life (OML) and including two or more spacecraft, including a first spacecraft disposed in a first orbit and a second spacecraft disposed in a second orbit. Each of the first orbit and the second orbit is substantially circular with a radius of approximately 42,164 km. The first orbit has a first specified inclination with respect to the equator and the second orbit has a second specified inclination with respect to the equator, the first specified inclination and the second specified inclination each being within a range of 10° to 20°. The first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation Δ-RAAN1. The stationkeeping strategy includes applying a first stationkeeping delta-V ($\Delta V1$) to the first spacecraft over the OML, and applying a second delta-V ($\Delta V2$), approximately equal to $\Delta V1$, to the second spacecraft over the OML, such that the Δ-RAAN1 over the OML is approximately constant and an actual inclination of each respective orbit within an acceptable variance from the specified inclination.

In some examples, the Δ-RAAN1 may be approximately 90°.

In some examples, the two or more spacecraft may include a third spacecraft disposed in a third orbit, where the third orbit has, at BOL, a third RAAN (BOL-RAAN3) the BOL-RAAN1 and the BOL-RAAN3 being separated by a second angular separation Δ-RAAN2 and the stationkeeping strategy includes applying a third delta-V ($\Delta V3$) to the third spacecraft over the OML, such that the Δ-RAAN2 is approximately constant and an actual inclination of each respective orbit within the acceptable variance from the specified inclination. In some examples, the Δ-RAAN1 is approximately equal to the Δ-RAAN2.

In some examples, the $\Delta V1$ and the $\Delta V2$ may be sufficient only to maintain the Δ-RAAN and the specified inclination approximately constant. In some examples, $\Delta V1$/OML may correspond to less than 45 meters per second per year.

In some examples, the first specified inclination may approximately equal the second specified inclination.

In some examples, the BOL-RAAN1 and the BOL-RAAN2 may be determined by executing, on a processor, at least two cycles of an optimization loop, the optimization loop including: (i) a first calculation, for a current set of beginning of life (BOL) orbit parameters and a current set of end of life (EOL) orbit parameters, a first stationkeeping delta-V requirement for the first spacecraft and a second stationkeeping delta-V requirement for the second spacecraft, sufficient to maintain the Δ-RAAN1 and the specified inclination approximately constant; (ii) a second calculation of a difference between the first stationkeeping delta-V requirement and the second stationkeeping delta-V requirement; and (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii). In some examples, the specified value may be less than 5 meters per second.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
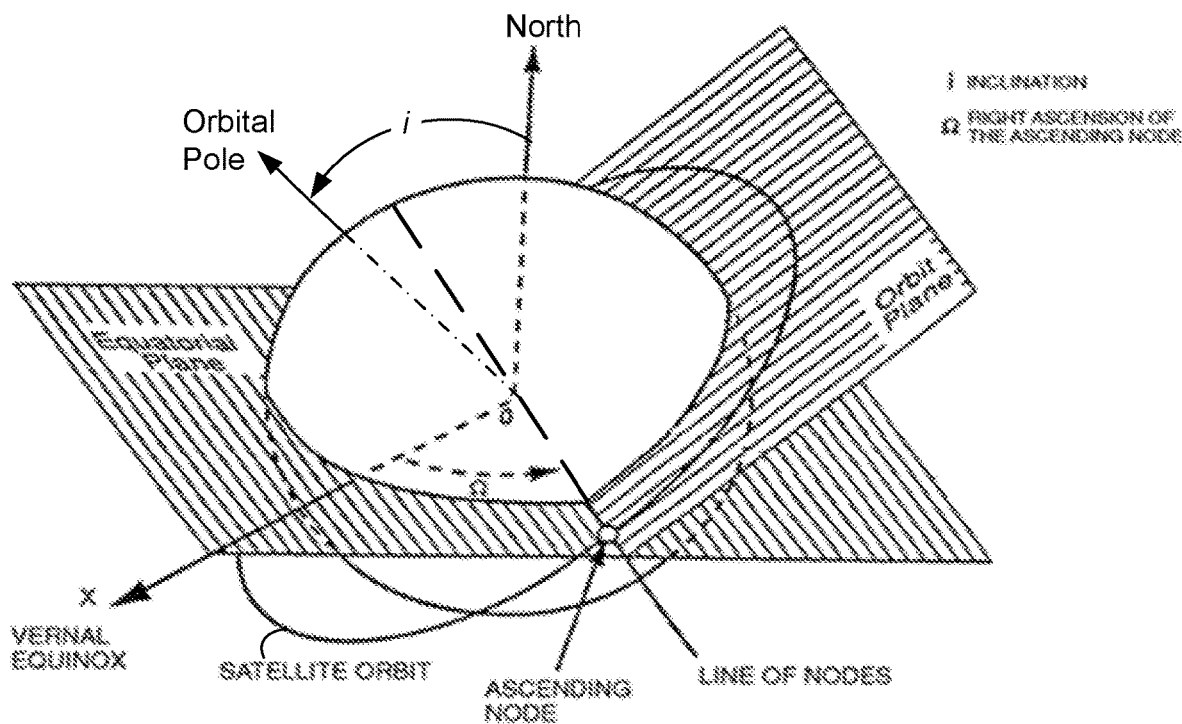
FIG. 1 illustrates characteristics of inclined orbits.
Figure 1:
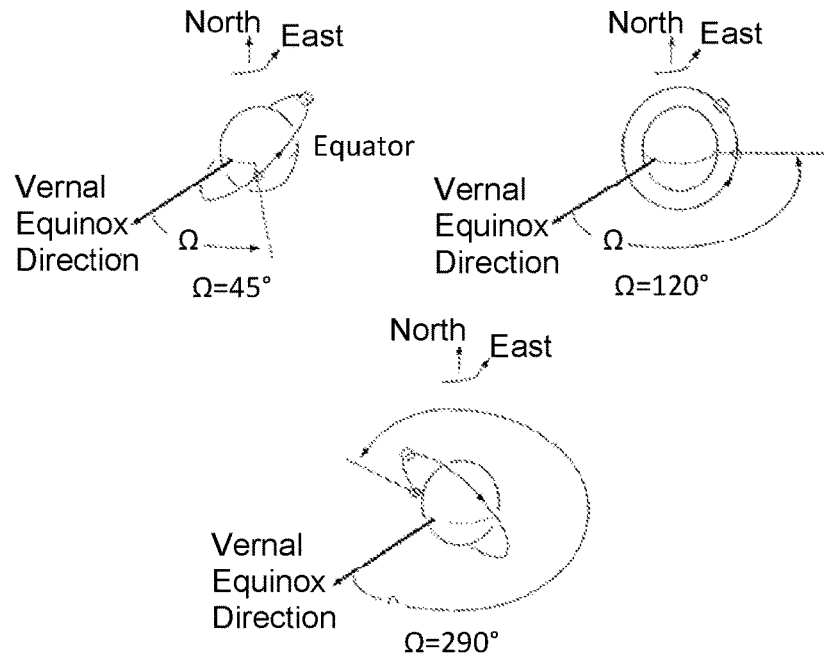

The present disclosure relates to a constellation of satellites disposed in moderately inclined, circular, geosynchronous orbits (i.e., an orbit having a radius of approximately 42,164 kilometers and an inclination to the equator within the range of about 5° to about 20°). One or more spacecraft may each be disposed in a respective one of two or more of such orbits. Referring now to FIG. 1, each orbit is contained in a respective orbit plane that crosses the plane of the equator at respective nodes, more particularly at an ascending node as indicated in FIG. 1 and a descending node (not illustrated) 180° from the ascending node. Each respective orbit plane will have a characteristic angle ($\Omega$) of right ascension of the ascending node (RAAN), and inclination (i) as defined in FIG. 1. In the absence of stationkeeping maneuvers, these parameters will tend to drift as a result, for example, of gravitational influences of the sun and moon, and such drift may impair the constellation's mission performance.

In the absence of the presently disclosed techniques, orbital inclination with respect to the equatorial plane and right ascension of ascending node (RAAN) may be maintained at a fixed value. The station keeping velocity change (delta-V) for such an approach may be as high as 120 meters per second per year (m/s/yr) per spacecraft for a constellation involving three spacecraft. For a two spacecraft constellation using this approach, the station keeping delta-V may be as high as 70 m/s/yr per spacecraft.

Alternatively, it is known that orbital inclination may be maintained at a nearly constant value while permitting RAAN to drift. Notwithstanding the drift in RAAN, constellation mission performance may be unimpaired if a constant relative difference in RAAN between orbit planes is maintained. For example, a constellation may include spacecraft disposed in three distinct orbit planes having three equally separated RAAN values (e.g., initially, 0°, 120° and 240°. The respective angular separations in RAAN of 120° may be maintained by treating one orbit plane as the "leader" having a particular natural rate of change of RAAN and correcting the RAAN rate of change of the other two ("follower") orbit planes so as to be, on average, equal by performing stationkeeping maneuvers. The "leader" orbit plane may nominally be selected to be the orbit plane with the median RAAN rate of change. If the above-described known technique were to be applied to the moderately inclined circular geosynchronous orbits contemplated by the present disclosure, as much as 67 m/s/yr of stationkeeping delta V would be required for the spacecraft in the "follower" orbit planes.

The presently disclosed techniques enable a significant reduction in stationkeeping delta V with respect to the above described approaches. Moreover, the disclosed techniques permit significantly reducing or even substantially eliminating differences, between multiple spacecraft in the constellation, in the stationkeeping delta V requirement. As a result, an increased degree of commonality between spacecraft may be achieved.

More particularly, one aspect of the presently disclosed techniques contemplate determining respective initial ("beginning of life" or "BOL") values of RAAN for each of two or more orbit planes. The respective BOL values are contemplated to have an angular separation ("$\Delta$-RAAN") that is to be maintained substantially constant throughout a mission lifetime of the constellation, such that differences, between spacecraft, in the stationkeeping delta V requirement are minimized. As a result, overall propellant consumption is substantially reduced relative to the previously known techniques identified above.

In an implementation, a constellation of Earth-orbiting spacecraft includes a first spacecraft disposed in a first orbit and a second spacecraft disposed in a second orbit. Each of the first orbit and the second orbit is substantially circular with a radius of approximately 42,164 km. The first orbit and the second orbit may each have a specified inclination with respect to the equator within a range of 10° to 20°. The first orbit has, at beginning of life (BOL), a first right ascension of ascending node (BOL-RAAN1) and the second orbit has, at BOL, a second RAAN (BOL-RAAN2). The BOL-RAAN1 and the BOL-RAAN2 are separated by an angular separation $\Delta$-RAAN. The constellation is configured such that a first stationkeeping delta-V ($\Delta V1$) applied over the constellation's mission operational maneuver life (OML) to the first spacecraft in combination with a second delta-V ($\Delta V2$) applied over the OML to the second spacecraft is sufficient to maintain an approximately constant value of $\Delta$-RAAN and to maintain actual inclination within an acceptable variance from the specified inclination. In an implementation, each of $\Delta V1$ and $\Delta V2$ is the respective stationkeeping delta-V required only for (i) adjusting a propagated value of RAAN to the target value and for (ii) maintaining actual orbital inclination within an acceptable variance from the specified inclination. Advantageously, the constellation is configured such that $\Delta V1$ approximately equals $\Delta V2$.

In an implementation, the constellation may be configured to operate within three distinct orbit planes having three equally separated RAAN values (i.e., $\Delta$-RAAN=120°). As a further example the constellation may be configured to operate within four distinct orbit planes having four equally separated RAAN values (i.e., $\Delta$-RAAN=90°). More generally, the constellation may be configured to operate within n distinct orbit planes having 'n' equally separated RAAN values (i.e., $\Delta$-RAAN=360°/n).

In an implementation, the constellation may be configured to operate within two distinct orbit planes, a first orbit having at beginning of life (BOL), a first right ascension of ascending node (BOL-RAAN1) and a second orbit having, at BOL, a second RAAN (BOL-RAAN2) the BOL-RAAN1 and the BOL-RAAN2 being separated by an angular separation $\Delta$-RAAN. In an implementation, as described in the related patent application, filed concurrently herewith and entitled "Inclined Geosynchronous Orbit Spacecraft Constellations", attorney docket number LORLP287, $\Delta$-RAAN may be approximately 90°.

Figure 2:
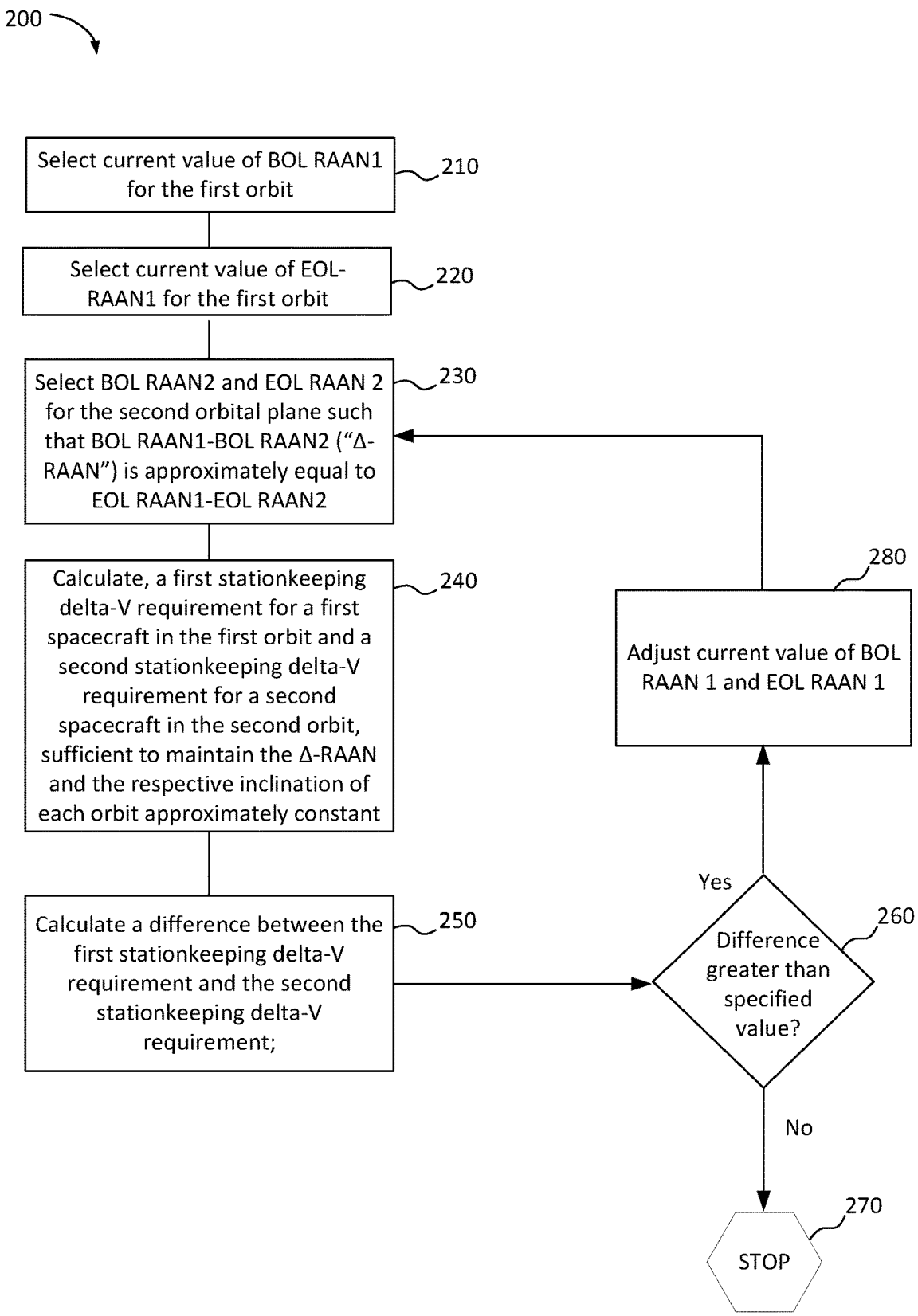
FIG. 2 illustrates an example of a method for optimizing a constellation stationkeeping strategy, according to an implementation.

Referring now to FIG. 2, a method 200 for optimizing a constellation stationkeeping strategy will be described. The constellation of Earth-orbiting spacecraft may be characterized by a current set of beginning of life (BOL) orbit parameters and a current set of end of life (EOL) orbit parameters. The constellation includes a first spacecraft disposed in a first orbit and a second spacecraft disposed in a second orbit, each of the first orbit and the second orbit being substantially circular with a radius of approximately 42,164 km. The first orbit is disposed in a first orbital plane and the second orbit is disposed in a second orbital plane. Each of the first orbital plane and the second orbital plane may have a similar specified inclination with respect to the equator within the range of 10° to 20°.

The current set of BOL orbit parameters includes, for the first orbital plane, a first BOL right ascension of ascending node (BOL RAAN1) and, for the second orbital plane, a second BOL RAAN (BOL RAAN2). At block 210, a current value of BOL RAAN1 may be selected.

The current set of EOL orbit parameters include, for the first orbit, a first EOL right ascension of ascending node (EOL-RAAN1) and, for the second orbit, a second EOL RAAN (EOL-RAAN2). At block 220, a current value of EOL RAAN1 may be selected.

At block 230 a value for BOL-RAAN2 and EOL-RAAN2 may be selected. The value for BOL-RAAN2 may be selected such that the BOL-RAAN1 and the BOL-RAAN2 are separated by a BOL angular separation BOL Δ-RAAN. The value for EOL-RAAN2 may be selected such that the EOL-RAAN1 and the EOL-RAAN2 are separated by an EOL angular separation EOL Δ-RAAN that is approximately equal to BOL Δ-RAAN.

At block 240 a first stationkeeping delta V requirement may be calculated for a first spacecraft in the first orbit and a second stationkeeping delta-V requirement may be calculated for a second spacecraft in the second orbit. For example, the orbits may be propagated from BOL RAAN to EOL RAAN by intervals equal to a useful interval between station keeping maneuvers. Each spacecraft may be allocated a target value for RAAN as a function of time based on an average rate of change in RAAN over life. The station keeping maneuvers may be determined so as to adjust a propagated value of RAAN to the target value and to maintain actual orbital inclination within an acceptable variance from the specified inclination.

At block 250, a difference between the first stationkeeping delta-V requirement and the second stationkeeping delta-V requirement may be calculated.

At block 260, a decision may be made whether the difference is greater than a specified value. For example it may be desirable to achieve a difference in delta V requirement on the order of 1 to 5 m/s/yr. If the decision is that the difference is not greater than the specified value, then the optimization process may be deemed to be completed in the method may stop, as indicated by block 270.

On the other hand, if the decision at block 260 is that the difference is greater than the specified value, the method may proceed to iterate an optimization loop including block 280, where a current value of BOL RAAN1 and EOL RAAN1 may be adjusted, and blocks 230, 240, 250 and 260.

Figure 3:
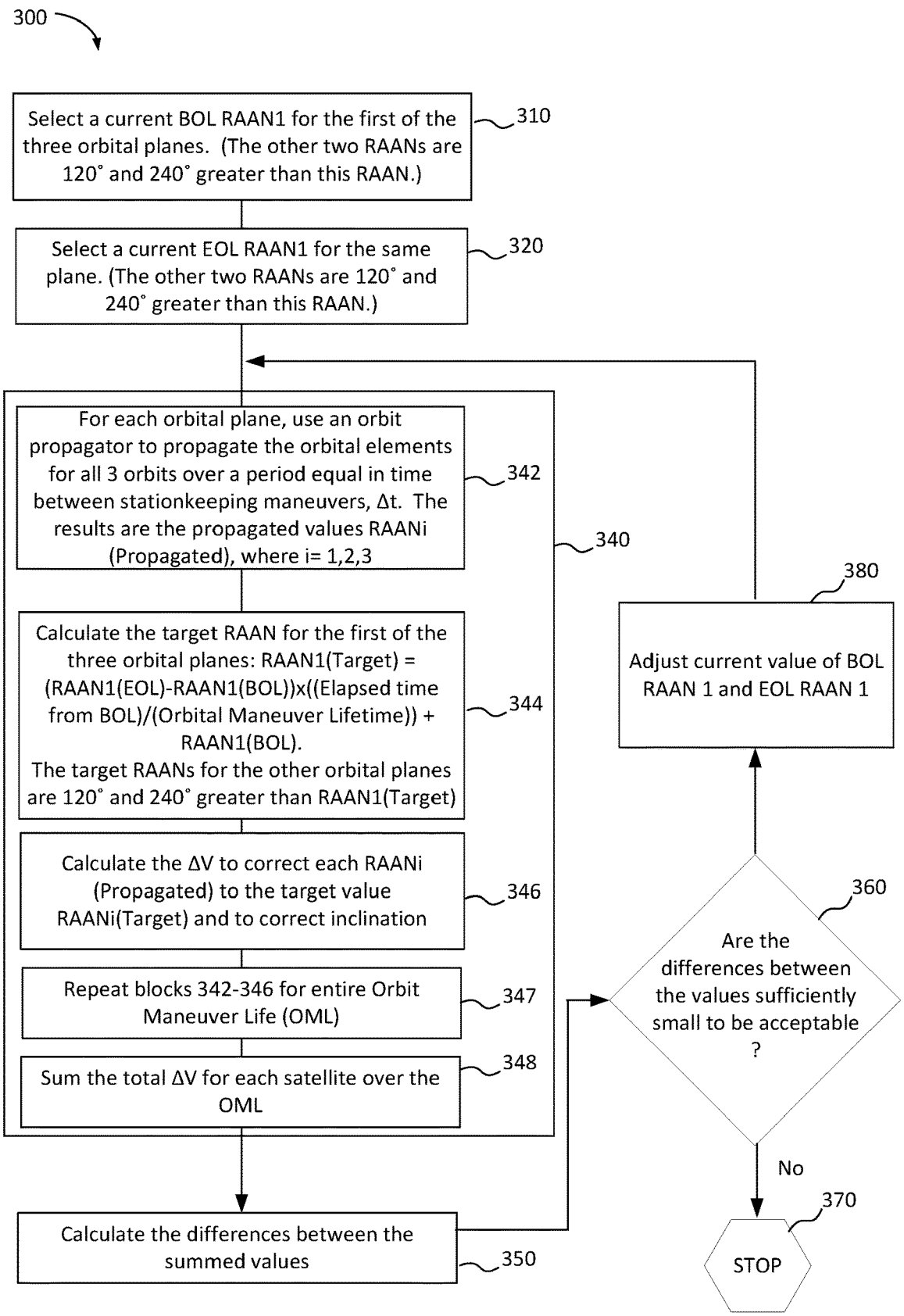
FIG. 3 illustrates a further example of a method for optimizing a constellation stationkeeping strategy, according to an implementation.

Referring now to FIG. 3, an example method 300 for optimizing a constellation stationkeeping strategy will be described, where the constellation consists of three orbit planes having respective RAAN's separated by equal angular intervals of 120°. The constellation of Earth-orbiting spacecraft may be characterized by a current set of beginning of life (BOL) orbit parameters and a current set of end of life (EOL) orbit parameters. The constellation includes a first spacecraft disposed in a first orbit, a second spacecraft disposed in a second orbit, and a third spacecraft disposed in a third orbit. Each of the first orbit, the second orbit and the third orbit, disposed in a respective orbital plane, may be substantially circular with a radius of approximately 42,164 km, and have a similar inclination with respect to the equator within the range of 10° to 20°.

The current set of BOL orbit parameters includes, for the first orbital plane, a first BOL right ascension of ascending node (BOL RAAN1). At block 310, a current value of BOL-RAAN1 may be selected. The selection of BOL-RAAN1 also defines, for the second orbital plane, a second BOL RAAN (BOL-RAAN2) approximately equal to BOL RAAN1+120°, and, for the third orbital plane, a third BOL RAAN (BOL-RAAN3) approximately equal to BOL RAAN1+240°.

The current set of EOL orbit parameters include, for the first orbit, a first EOL right ascension of ascending node (EOL-RAAN1). At block 320, a current value of EOL RAAN1 may be selected. The selection of EOL-RAAN1 also defines, for the second orbital plane, a second EOL RAAN (EOL-RAAN2) approximately equal to EOL RAAN1+120°, and, for the third orbital plane, a third EOL RAAN (EOL-RAAN3) approximately equal to EOL RAAN1+240°.

At block 340 a first stationkeeping delta V (ΔV) requirement may be calculated for a first spacecraft in the first orbit, a second stationkeeping ΔV requirement may be calculated for a second spacecraft in the second orbit, and a third stationkeeping ΔV requirement may be calculated for a second spacecraft in the second orbit.

In the illustrated example, at block 342 for each orbital plane an orbit propagator may be used to propagate the orbital elements for each orbit over a period of time selected to correspond to an interval between station keeping maneuvers Δt. The results are the propagated values $RAAN_i$ (Propagated), where i=1, 2, 3.

At block 344, a target value of RAAN for the first orbital plane may be calculated. In the illustrated example, RAAN1 (Target)=(RAAN1(EOL)−RAAN1(BOL))×((Elapsed time from BOL)/(Orbital Maneuver Lifetime))+RAAN1(BOL) as a function of time based on an average rate of change in RAAN over life. The calculation of RAAN1(target) also defines, for the second orbital plane, a second target RAAN (RAAN2(target)) approximately equal to RAAN1(target)+120°. Likewise, the calculation of RAAN1(target) also defines, for the third orbital plane, a third target RAAN (RAAN3(target)) approximately equal to RAAN1(target)+240°.

At block 346, the stationkeeping ΔV required to correct each $RAAN_i$ (Propagated) to the target value $RAAN_i$ (Target) and to maintain inclination within an acceptable variance from a desired value may be calculated.

As indicated at block 347, the method 300 contemplates repeatedly executing blocks 342, 344, and 346 a sufficient number of times to determine a series of stationkeeping ΔV's for each stationkeeping maneuver for each of the first spacecraft, the second spacecraft and the third spacecraft for the entire OML. At block 348, the total ΔV requirement required for each spacecraft over the spacecraft's OML, extending from BOL to EOL, may be determined by summing the above determined individual stationkeeping ΔV's.

At block 350, differences between the summed stationkeeping ΔV requirements for the spacecraft may be calculated. For example, a difference may be computed between the spacecraft having the minimum stationkeeping $\Delta V$ requirement and the spacecraft having the maximum stationkeeping $\Delta V$ requirement.

At block 360, a decision may be made whether the difference is greater than a specified value. For example it may be desirable to achieve a difference in $\Delta V$ requirement less than, for example, a specified value in the range of about 1 to 5 m/s/yr. If the decision is that the difference is not greater than the specified value, then the optimization process may be deemed to be completed and the method may stop, as indicated by block 370.

On the other hand, if the decision at block 360 is that the difference is greater than the specified value, the method may proceed to iterate an optimization loop including block 380, where a current value of BOL RAAN1 and EOL RAAN1 may be adjusted, and the process may proceed through block 340, block 350 and block 360.

Example results of executing method 300 for the three orbit plane constellation described above assuming a 15-year OML and a BOL beginning in 2019, are presented in FIGS. 4 through 7.

Figure 4:
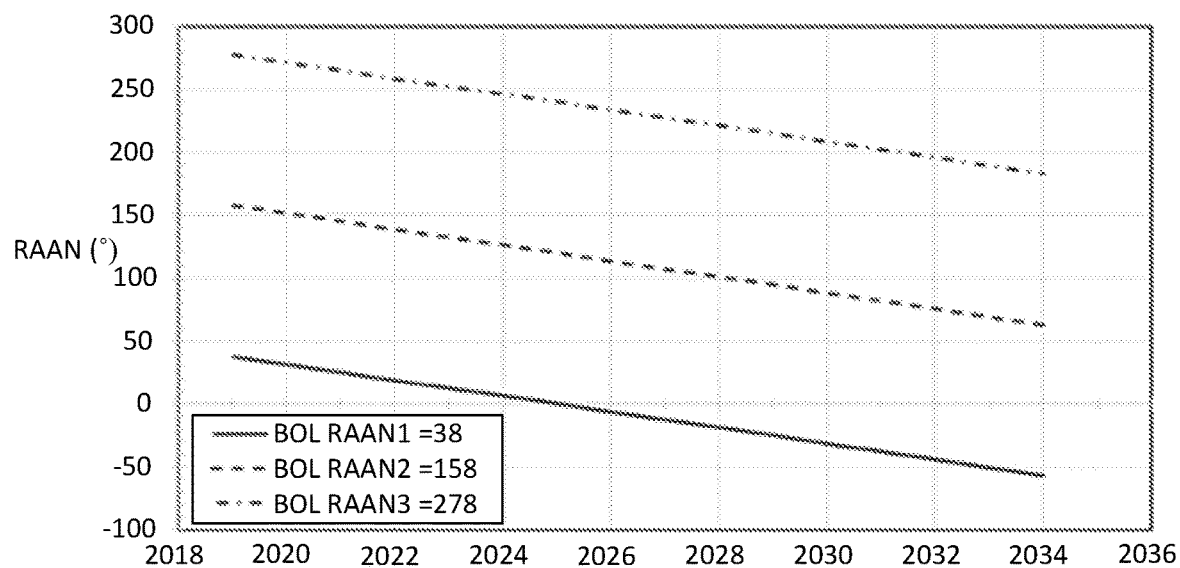
FIG. 4 illustrates optimized values of right ascension of the ascending node (RAAN), as a function of time, according to an implementation.

Referring first to FIG. 4, the optimized values of BOL-RAAN1 and EOL-RAAN1 obtained by method 300 were 38° and −56.8° (303.2°), respectively. The angular separations between the orbit planes remain approximately constant at 120° throughout life. Accordingly, the optimized values of BOL-RAAN2 and EOL-RAAN2 are 158° and 63.2°, respectively, and the optimized values of BOL-RAAN3 and EOL-RAAN3 are 278° and 183.2°, respectively. It may be observed that between BOL and EOL, RAAN of each orbit plane rotates at an approximately constant rate.

Figure 5:
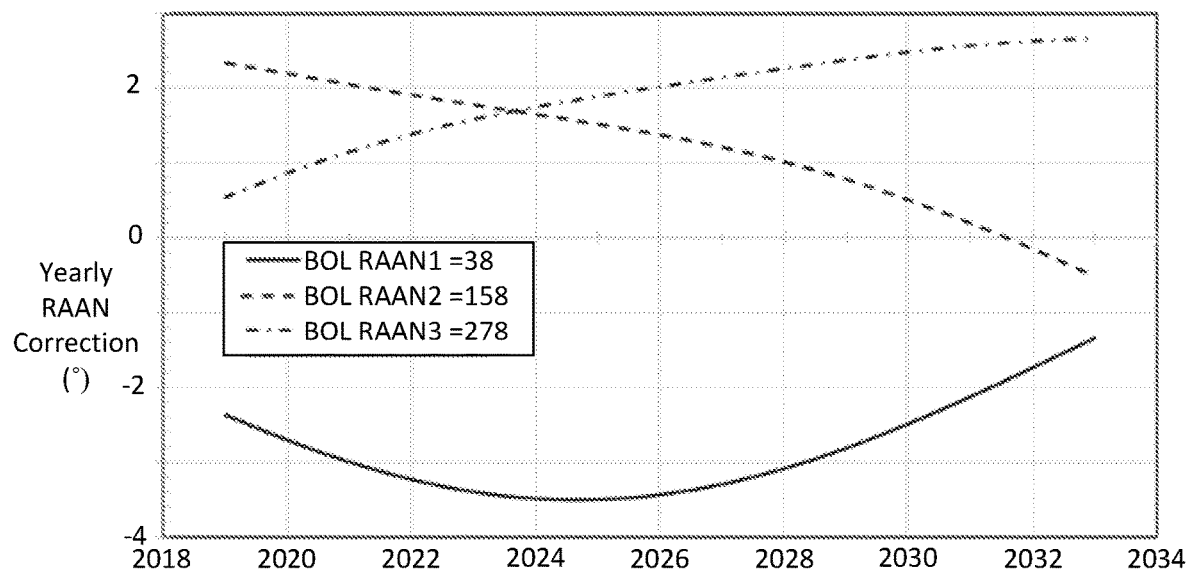
FIG. 5 illustrates the annualized RAAN adjustment for each orbit plane in order to as a function of time, according to an implementation.

Referring to FIG. 5, the annualized RAAN adjustment for each orbit plane in order to maintain 120° separation between orbit planes is plotted as a function of time.

Figure 6:
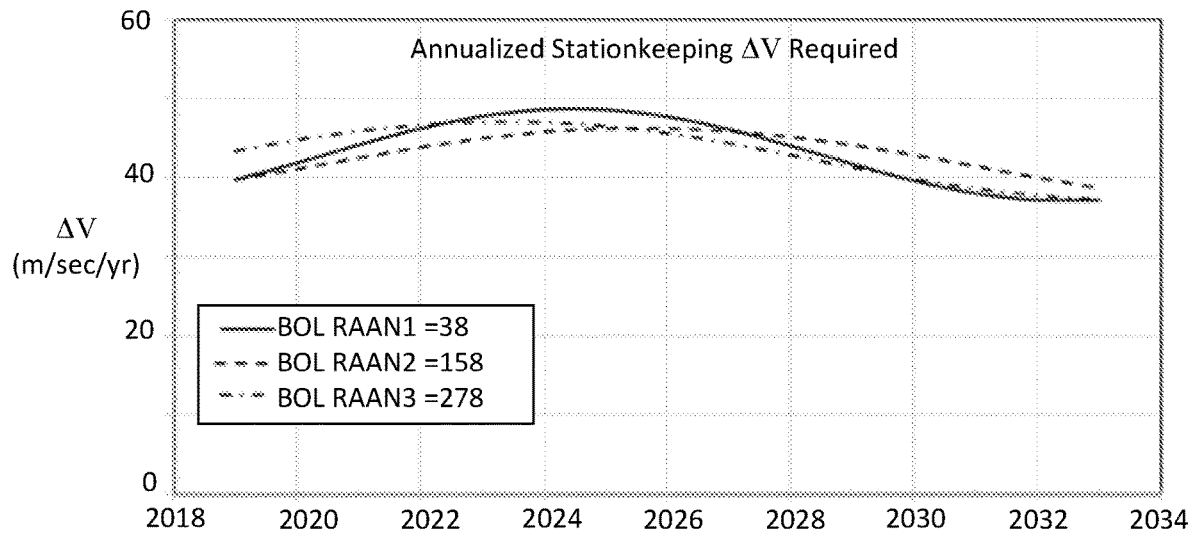
FIG. 6 depicts the annualized $\Delta V$ required to obtain the optimized RAAN correction as a function of time, according to an implementation.

FIG. 6 depicts the annualized $\Delta V$ required to obtain the RAAN correction illustrated in FIG. 5 and to maintain orbit inclination within the acceptable variance from the desired value.

Figure 7:
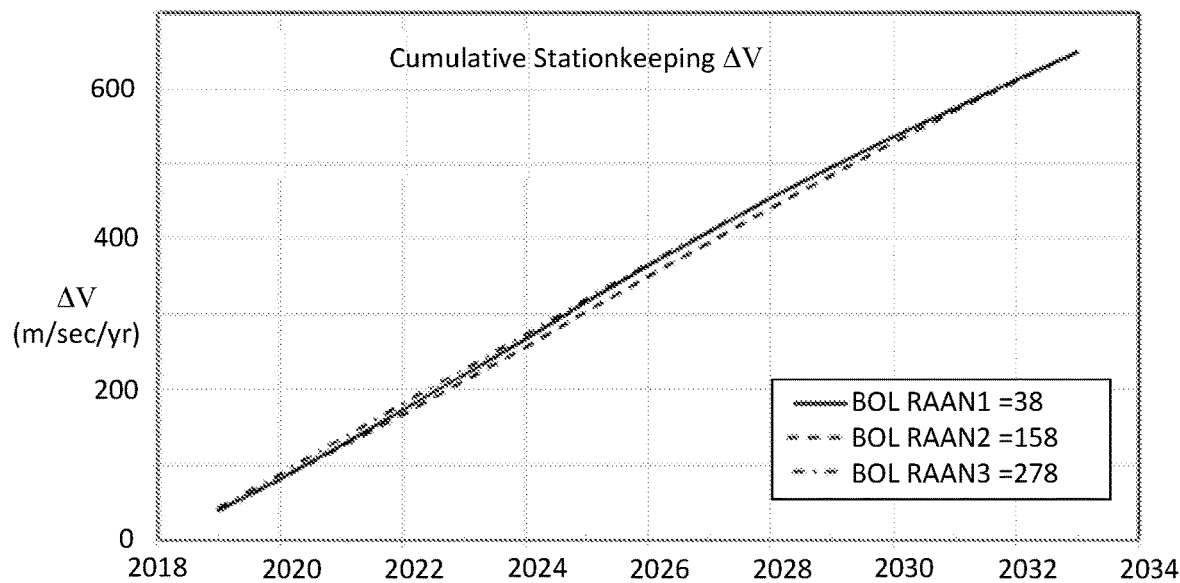
FIG. 7 illustrates the cumulative $\Delta V$ for each spacecraft as a function of time, according to an implementation.

FIG. 7 illustrates the cumulative $\Delta V$ for each spacecraft as a function of time. It may be observed that the cumulative $\Delta V$ at the end of the 15 year mission for each spacecraft is approximately identical. The cumulative $\Delta V$ was found to be approximately 650 m/s (about 43.3 m/s/yr on average). Such a $\Delta V$ is substantially smaller than results obtained using prior art techniques. Moreover, because each spacecraft has essentially the same $\Delta V$ requirement, an enhanced degree of design commonality between spacecraft may be obtained.

Figure 8:
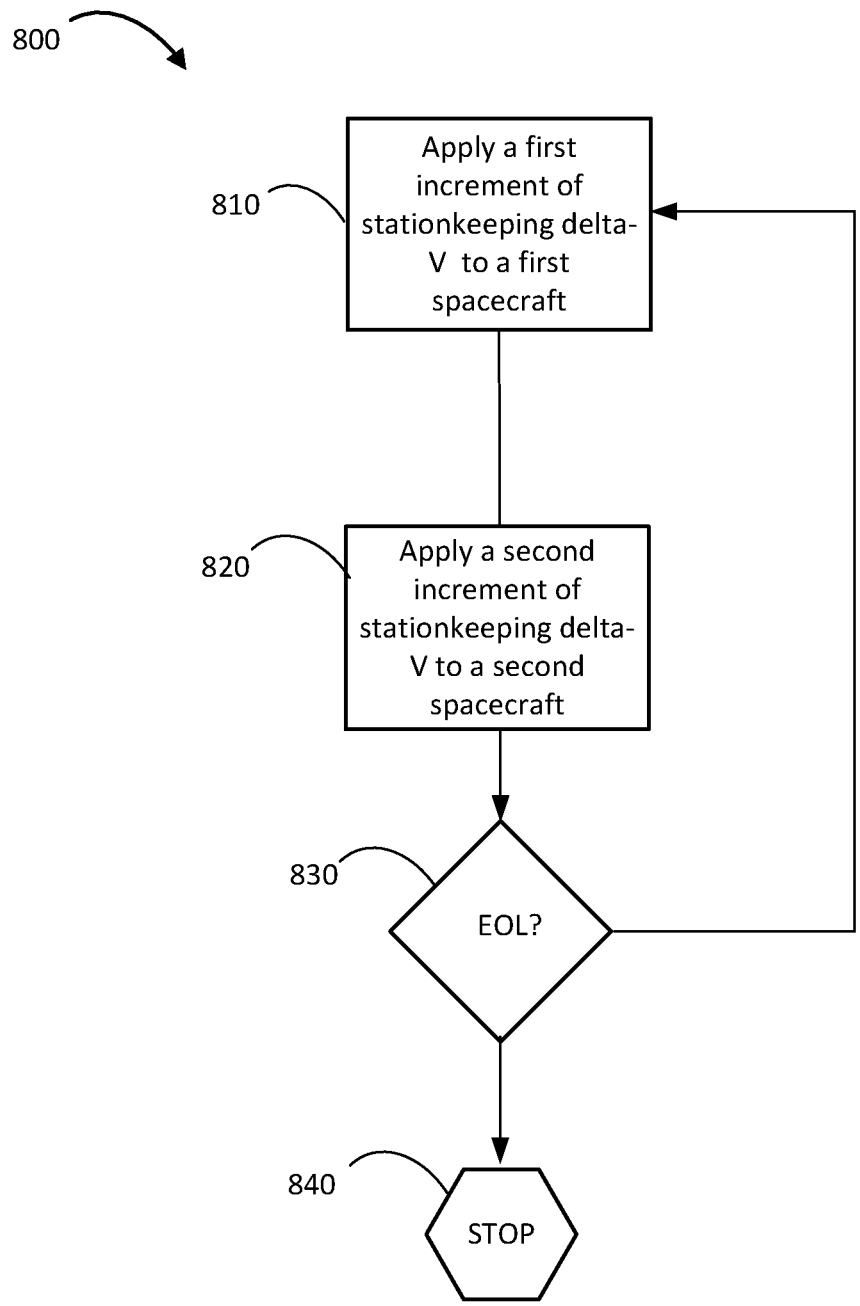
FIG. 8 illustrates a method of executing a stationkeeping strategy for a constellation of Earth-orbiting spacecraft, according to an implementation.

FIG. 8 illustrates a method 800 of executing a stationkeeping strategy for a constellation of Earth-orbiting spacecraft. As described above, the constellation may have an orbital maneuver lifetime life (OML) and include two or more spacecraft, including a first spacecraft disposed in a first orbit and a second spacecraft disposed in a second orbit. Each of the first orbit and the second orbit may be substantially circular with a radius of approximately 42,164 km. The first orbit may have a first specified inclination with respect to the equator and the second orbit may have a second specified inclination with respect to the equator, the first specified inclination and the second specified inclination each being within a range of 10° to 20°. The first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation $\Delta$-RAAN1.

The stationkeeping strategy may include applying, at periodic intervals, a first increment of stationkeeping delta-V to a first spacecraft, block 810, and a second increment of stationkeeping delta-V to a second spacecraft, block 820. If a determination at block 830 is that the constellation has reached EOL, the method may stop, as indicated by block 840. Otherwise the method may proceed by returning to block 810. Blocks 810 and 820, accordingly, may be repeated over the entire OML. The first increment and the second increment of delta-V may be selected such that the $\Delta$-RAAN1 over the OML is approximately constant and an actual inclination of each respective orbit within an acceptable variance from the specified inclination.

Thus, improved techniques for stationkeeping of spacecraft disposed in moderately inclined geosynchronous orbits have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A constellation of Earth-orbiting spacecraft, the constellation having an orbital maneuver lifetime life (OML) and comprising:
   two or more spacecraft, including a first spacecraft disposed in a first orbit and a second spacecraft disposed in a second orbit, wherein:
      each of the first orbit and the second orbit is substantially circular with a radius of approximately 42,164 km;
      the first orbit has a first specified inclination with respect to the equator and the second orbit has a second specified inclination with respect to the equator, the first specified inclination and the second specified inclination each being within a range of 10° to 20°;
      the first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation $\Delta$-RAAN1;
      a first stationkeeping delta-V ($\Delta V1$) applied in a first series of stationkeeeping maneuvers over the OML to the first spacecraft, in combination with a second delta-V ($\Delta V2$) applied in a second series of stationkeeeping maneuvers over the OML to the second spacecraft, is sufficient to maintain the $\Delta$-RAAN1 approximately constant and an actual inclination of the first orbit and the second orbit approximately equal, respectively, to the first specified inclination and second specified inclination;
      $\Delta V1$ approximately equals $\Delta V2$ and
      stationkeeping maneuvers in the first and second series of stationkeeeping maneuvers are determined so as to concurrently adjust a propagated value of RAAN to a target value for RAAN and to maintain actual orbital inclination approximately equal to a respective specified inclination.

2. The constellation of claim 1, wherein each spacecraft is disposed only in the first orbit or the second orbit and the $\Delta$-RAAN1 is approximately 90°.

3. The constellation of claim 1, wherein the two or more spacecraft include a third spacecraft disposed in a third orbit having a third specified inclination, wherein:

the third orbit has, at BOL, a third RAAN (BOL-RAAN3) the BOL-RAAN1 and the BOL-RAAN3 being separated by a second angular separation Δ-RAAN2; and ΔV1, in combination with a third delta-V (ΔV3) applied over the OML to the third spacecraft, is sufficient to maintain the Δ-RAAN2 approximately constant and an actual inclination of each orbit approximately equal, respectively, to the first specified inclination, the second specified inclination and the third specified inclination.

4. The constellation of claim 3, wherein the Δ-RAAN1 is approximately equal to the Δ-RAAN2.

5. The constellation of claim 1, wherein the ΔV1 and the ΔV2 are sufficient only to maintain the Δ-RAAN and the actual first inclination and actual second inclination approximately constant.

6. The constellation of claim 5, wherein ΔV1/OML corresponds to less than 45 meters per second per year.

7. The constellation of claim 1, wherein the first specified inclination approximately equals the second specified inclination.

8. The constellation of claim 1, wherein the BOL-RAAN1 and the BOL-RAAN2 are determined by executing, on a processor, at least two cycles of an optimization loop, the optimization loop including:
   (i) a first calculation, for a current set of beginning of life (BOL) orbit parameters and a current set of end of life (EOL) orbit parameters, a first stationkeeping delta-V requirement for the first spacecraft and a second stationkeeping delta-V requirement for the second spacecraft, sufficient to maintain the Δ-RAAN1 and the specified inclination approximately constant;
   (ii) a second calculation of a difference between the first stationkeeping delta-V requirement and the second stationkeeping delta-V requirement; and
   (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii).

9. A method comprising:
selecting, for a constellation of Earth-orbiting spacecraft, a current set of beginning of life (BOL) orbit parameters and a current set of end of life (EOL) orbit parameters, the constellation including a first spacecraft disposed in a first orbit and a second spacecraft disposed in a second orbit, each of the first orbit and the second orbit being substantially circular with a radius of approximately 42,164 km, the first orbit being disposed in a first orbital plane and the second orbit being disposed in a second orbital plane, each of the first orbital plane and the second orbital plane having a specified inclination with respect to the equator within a range of 10° to 20°, the current set of BOL orbit parameters including, for the first orbital plane, a first BOL right ascension of ascending node (BOL-RAAN1) and, for the second orbital plane, a second BOL RAAN (BOL-RAAN2), the BOL-RAAN1 and the BOL-RAAN2 being separated by a BOL angular separation, BOL Δ-RAAN, the current set of EOL orbit parameters including, for the first orbit, a first EOL right ascension of ascending node (EOL-RAAN1) and, for the second orbit, a second EOL RAAN (EOL-RAAN2), the EOL-RAAN1 and the EOL-RAAN2 being separated by an EOL angular separation EOL Δ-RAAN that is approximately equal to BOL Δ-RAAN; and optimizing a constellation stationkeeping strategy, by executing, on a processor, at least two cycles of an optimization loop, the optimization loop comprising:
   (i) a first calculation, for the current set of beginning of life (BOL) orbit parameters and the current set of end of life (EOL) orbit parameters, a first stationkeeping delta-V requirement for the first spacecraft and a second stationkeeping delta-V requirement for the second spacecraft, sufficient to maintain the Δ-RAAN and the specified inclination approximately constant;
   (ii) a second calculation of a difference between the first stationkeeping delta-V requirement and the second stationkeeping delta-V requirement; and
   (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii).

10. The method of claim 9, wherein the first stationkeeping delta-V requirement and the second stationkeeping delta-V requirement are sufficient only to maintain the Δ-RAAN and the specified inclination approximately constant.

11. The method of claim 9, wherein the specified value is less than 5 meters per second.

12. A method comprising:
executing a stationkeeping strategy for a constellation of Earth-orbiting spacecraft, the constellation having an orbital maneuver lifetime life (OML) and including two or more spacecraft, including a first spacecraft disposed in a first orbit and a second spacecraft disposed in a second orbit, wherein:
   each of the first orbit and the second orbit is substantially circular with a radius of approximately 42,164 km;
   the first orbit has a first specified inclination with respect to the equator and the second orbit has a second specified inclination with respect to the equator, the first specified inclination and the second specified inclination each being within a range of 10° to 20°;
   the first orbit has, at beginning of life (BOL), a first right ascension of ascending node (BOL-RAAN1) and the second orbit has, at BOL, a second RAAN (BOL-RAAN2) the BOL-RAAN1 and the BOL-RAAN2 being separated by a first angular separation Δ-RAAN1;
   the stationkeeping strategy includes applying a first stationkeeping delta-V (ΔV1) in a first series of stationkeeeping maneuvers to the first spacecraft over the OML, and applying a second delta-V (ΔV2), approximately equal to ΔV1, to the second spacecraft in a second series of stationkeeeping maneuvers over the OML, such that the Δ-RAAN1 over the OML is approximately constant and an actual inclination of the first orbit and the second orbit approximately equal, respectively, the first specified inclination and the second specified inclination; and stationkeeping maneuvers in the first and second series of stationkeeeping maneuvers are determined so as to concurrently adjust a propagated value of RAAN to a target value for RAAN and to maintain actual orbital inclination approximately equal to a respective specified inclination.

13. The method of claim 12, wherein the Δ-RAAN1 is approximately 90°.

14. The method of claim 12, wherein the two or more spacecraft include a third spacecraft disposed in a third orbit, wherein:

the third orbit has, at BOL, a third RAAN (BOL-RAAN3) the BOL-RAAN1 and the BOL-RAAN3 being separated by a second angular separation Δ-RAAN2; and the stationkeeping strategy includes applying a third delta-V (ΔV3) to the third spacecraft over the OML, such that the Δ-RAAN2 is approximately constant and an actual inclination of each orbit approximately equal, respectively, to the first specified inclination, the second specified inclination and the third specified inclination.

15. The method of claim 14, wherein the Δ-RAAN1 is approximately equal to the Δ-RAAN2.

16. The method of claim 12, wherein the ΔV1 and the ΔV2 are sufficient only to maintain the Δ-RAAN and the actual first inclination and the actual second inclination approximately constant.

17. The method of claim 16, wherein ΔV1/OML corresponds to less than 45 meters per second per year.

18. The method of claim 12, wherein the first specified inclination approximately equals the second specified inclination.

19. The method of claim 12, wherein the BOL-RAAN1 and the BOL-RAAN2 are determined by executing, on a processor, at least two cycles of an optimization loop, the optimization loop including:

(i) a first calculation, for a current set of beginning of life (BOL) orbit parameters and a current set of end of life (EOL) orbit parameters, a first stationkeeping delta-V requirement for the first spacecraft and a second stationkeeping delta-V requirement for the second spacecraft, sufficient to maintain the Δ-RAAN1 and the specified inclination approximately constant;

(ii) a second calculation of a difference between the first stationkeeping delta-V requirement and the second stationkeeping delta-V requirement; and (iii) a decision block wherein, when the difference is not greater than a specified value, a first decision of the decision block is that the constellation stationkeeping strategy is sufficiently optimized, and when the difference is greater than the specified value, a second decision of the decision block is to enter a step of adjusting the current set of beginning of life (BOL) orbit parameters and the current set of end of life (EOL) orbit parameters and repeat steps (i) and (ii).

20. The method of claim 19, wherein the specified value is less than 5 meters per second.

* * * * *